United States Patent
Bishop et al.

(10) Patent No.: US 6,487,310 B1
(45) Date of Patent: Nov. 26, 2002

(54) SIGNATURE MATCHING

(75) Inventors: Christopher M. Bishop, Stanton-St-John (GB); Colin G. Windsor, Goring (GB)

(73) Assignee: PenOp Ltd. (GB)

(*) Notice: Subject to any disclaimer, the term of this patent is extended or adjusted under 35 U.S.C. 154(b) by 0 days.

(21) Appl. No.: 09/251,278

(22) Filed: Feb. 16, 1999

Related U.S. Application Data (63) Continuation-in-part of application No. 08/823,648, filed on Jan. 31, 1997, now abandoned, which is a continuation of application No. 08/393,234, filed on Feb. 23, 1995, now abandoned, which is a continuation of application No. 07/935,164, filed on Aug. 26, 1992, now abandoned.

(30) Foreign Application Priority Data

Sep. 6, 1991 (GB) ............................................. 9119139

(51) Int. Cl.[7] ................................................. G06K 9/00
(52) U.S. Cl. ........................ 382/186; 382/187; 382/201
(58) Field of Search ................................. 382/186, 187, 382/190, 192, 201, 219

(56) References Cited

U.S. PATENT DOCUMENTS

| 5,040,222 A | 8/1991 | Muroya |
| 5,101,437 A | 3/1992 | Plamondon |
| 5,202,930 A | 4/1993 | Livshitz et al. |

*Primary Examiner*—Matthew C. Bella
(74) *Attorney, Agent, or Firm*—D. Peter Hochberg; Katherine R. Vieyra; Sean Mellino (57) ABSTRACT

The invention is of an "elastic matching" method for comparing one signature against another, comprising the operations of creating a mapping between corresponding points in two signatures to be compared measured at different times after the commencement of writing the signatures which maximizes the correlation between the local spatial neighborhood of the measured points and simultaneously minimizes the curvature of the elastic spatial distortion from the mapping, providing quantitative measures of both the degree of the spatial correlations and the degree of the non-uniform spatial distortions in the mapping, thereby providing measures of the similarity between the signatures.

16 Claims, 4 Drawing Sheets

SIGNATURE MATCHING

This application is a continuation-in-part of Ser. No. 08/823,648 filed Jan. 31, 1997 now abandoned, which is a continuation of Ser. No. 08/393,234 filed Feb. 23, 1995 now abandoned, which is a continuation of Ser. No. 07/935,164 filed Aug. 26, 1992 now abandoned.

BACKGROUND OF THE INVENTION

1. Field of the Invention

The present invention relates to a method for matching one signature with another and more specifically to a method for verifying signatures written as a part of a transaction.

2. Description of Prior Art

Existing debit or credit cards have on them a signature provided by a person to whom the credit card has been issued. During a debit or credit card transaction the person making the transaction signs a voucher and the other party to the transaction compares the two signatures before completing the transaction. A similar operation is carried out for check verification. As the card used for the transaction carries the signature of the holder of the card, it is possible for someone who obtains the card illegally to practice the signature and so obtain money or goods by false pretences. The problem is a major one and it is estimated that some eight hundred million dollars are lost in this way annually.

A signature represents a two-dimensional pattern, but by the nature of its creation from human writing, it can be classified according to a one-dimensional variable-time method. Variations in this method have been proposed. For example, Herbet and Lui published a method based on the use of acceleration-time functions that reduced the level of acceptance of forgeries by some 98%.

Other prior art methods have been used for detecting authentic and forged signatures. For example, the method of U.S. Pat. No. 5,202,930 (Livshitz et al.) is concerned with the distribution of stylus accelerations during the writing of test and reference signatures. Livshitz et al. sets out to remove distorting effects, which can arise due to causes such as a test signature being written at a different overall speed from the reference signature. This method differs from the current invention, which is concerned with the relative positions of a stylus at given intervals after the start of the writing of reference and test signatures.

Livshitz et al. is an example of a well-known "sliding window" technique for recognizing non-linear distortions in time between two time-dependent functions. The method finds localized links between regions of a test function or window and a reference function or window, sliding one window against the other and observing the position in the test window where local correlations are maximized. The technique compares the distance that the function or window had to slide in several corresponding intervals with an authenticated signature. The distances of the several windows are then entered into a classification algorithm such as a histogram.

The drawback with the Livshitz approach is that the position in the test function giving the best correlation may not correspond to the optimal linkage between the functions. The problem can be exemplified by an attempt to match the signature "Folly". The two "l"s in the signature would provide identical sliding window fits at two different times, as the first "l" in one signature would match equally well with either "l" in the second signature. This difficulty is overcome in the present invention by minimizing a total energy term with correlation, spatial distortion, bond and timing distortion terms which ensures that the whole signature has a smooth low-curvature spatial distortion that simultaneously gives a good correlation along the complete signature. Any sharp error such as a match to the wrong "l" in "Folly" gives an immediate increase in the spatial distortion energy. It is to be noted that while in Livshitz et al. only correlation is optimized, and only time distortions are measured, the present invention introduces the distinct concept of spatial distortion curvature. It is only in the current invention that the two concepts of correlation and spatial distortion appear as separate and distinct terms and only the summed total is minimized.

U.S. Pat. No. 5,101,437 (Plamondon) is concerned with the creating of parameters corresponding to handwritten strings, based on the presence or lifting of a pen during the signature. As in the current invention, Plamondon teaches correlation of the average vectors as an initial step. However, the Plamondon technique proceeds by deriving evaluating functions, concerned with the curvilinear and angular velocities of the signatures, which are compared in order individually, so that the signature is deemed a forgery if any of the functions do not meet the specified criteria.

The current invention overcomes the shortcomings with the prior art by providing a matching technique, which first uses the mean vector to find distortion values for a set of points along two signatures, and then matches those points which have a minimum distortion and maximum correlation

SUMMARY OF THE INVENTION

In accordance with a preferred embodiment of the present invention, there is provided a method for matching a reference signature designated (R) with a questioned, signature designated (Q) to determine whether the signatures are written by a specified person, comprising the operations of creating a mapping between points in the two signatures to be compared, measured at corresponding times after the commencement of the writing of each of the signatures, which maximizes the correlation between the spatial neighborhoods of the measured points in the signatures and simultaneously minimizes the curvature of the distortions in the mapping. Quantitative measures of both the maximum of the correlations between the spatial neighborhoods of the measured points in the signatures and the minimum of the curvature of the distortions are provided, thereby to giving a measure of the similarity between the two signatures, comparing the measure of similarity between the signatures with an accepted criterion of similarity indicative of an acceptable probability that both signatures were written by the specified person and providing an indication of the acceptance or rejection thereof.

A novel aspect of the current invention is the simultaneous use of correlation of the average vectors, as in Plamondon, and a time mapping similar in intent to that of Livshitz et al. to minimize a total energy function which finds a smooth, low curvature, distortion between the signatures and simultaneously maximizes the correlation between the matched points of the signature. The present invention also makes use of time variations to compare signatures and has some similarities to the method of spectrum matching published in UK Patent Application 2,225,149A. The essential difference, however, is that a signature represents a continuous pair of x and y spatial variables recorded as a function of time, rather than sets of variables defined at the discrete times corresponding to peaks in the spectra to be matched. The nature of the correlation, therefore, is quite different.

The present invention goes beyond the prior art and does not involve sliding a function representing a trial signature against another function representing a reference signature to determine the best fit between them as suggested in Livshitz et al., but uses a procedure in which trial linkages at a chosen time after the start of the writing of the two signatures are made, and then refined using a Monte Carlo simulated annealing procedure so as to maximize local correlations between the test and reference signatures, while minimizing the elastic distortion energies of the linkages between corresponding points on the two signatures (this is what is meant by minimizing the curvature of the distortions in the mapping). This concept is not relevant to the technique adopted in Livshitz et al. because Livshitz et al. is concerned solely with time distortions, while the present invention is concerned with spatial differences with time components being an independent variable under the control of the user.

In summary, there are two important differences between the approach of Livshitz et al. and the current invention. Whereas Livshitz et al. use a "sliding window" approach to find a time shift which minimizes time distortion, the current invention minimizes the curvature of the time distortion. This difference is crucial. The current invention defines a distortion energy Edist, which correctly describes the elastic energy of a rubber sheet, stretched from one signature to another. There is no counterpart to this energy in Livshitz et al.

The second crucial difference with Livshitz et al is that they make their classification from the histogram of phase distortions, which uses only the timing information. The current invention uses a more complex function including correlation, distortion, bond and timing terms.

Applying the Plamondon equations to Livshitz et al. would not disclose the current invention's matching technique, which first uses the mean vector to find distortion values for a set of points along two signatures, and then matches those points which have a minimum distortion and maximum correlation.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
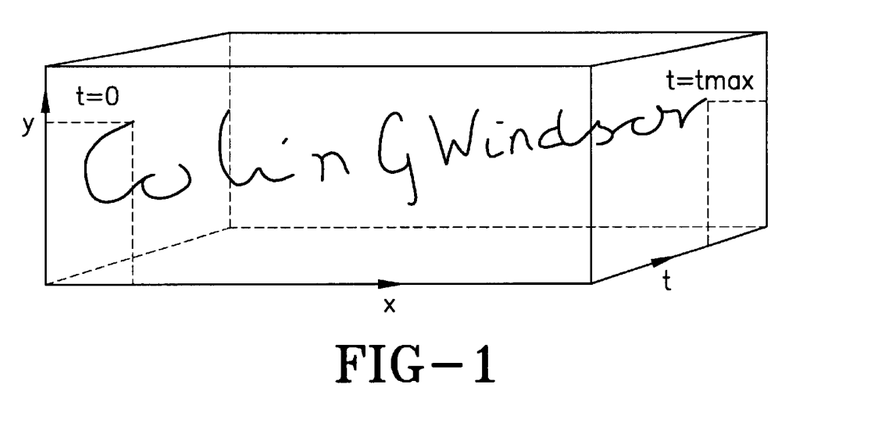
FIG. 1 illustrates how a signature may be considered a discontinuous line in three-dimensional space-time.

Referring now to the drawings wherein the showings are for the purpose of illustrating the preferred embodiment of the invention only, and not for the purpose of limiting the same, a signature written on a touch sensitive pad or digitizer is digitized in both position and time to give a sequence of spatial positions x(t), y(t) which add the further dimensions of time (t) to the definition of the signature. The signature can now be represented by a discontinuous line in three dimensions as shown in FIG. 1, the spatial and time characteristics of which can be held in a database. Verification of a questioned signature involves a comparison of corresponding parameters of that signature with those of the reference signature in the database.

The method of the invention, known as elastic matching, is to define an energy function which includes a term related to the elastic strain energy of a rubber sheet or plastic sheet on which the reference signature is traced, and then stretched until the signature overlays the questioned signature. This strain energy is purely theoretical in conceptualization and expressed in terms of mathematics, and should not be confused with actual strain of a digitized or touch sensitive pad, which is normally not elastic at all. This theoretical strain energy will generally be low for authentic signatures and higher for forgeries. The particular definition of the distortion energy defined later involves the sum of squares of spatial co-ordinate differences and is directly related to the elastic strain energy of an ideally elastic sheet. There is no known prior art in this field, which uses this concept.

For the method to work it is necessary that corresponding parts of the reference and questioned signature are overlaid correctly, or correlate well. If the signatures are authentic, it is likely that optimally adjusting the elastic sheet will result in a high correlation, while for forgeries no precise overlay can be found and the correlation is low. Because of the elastic stretching of the signatures, the correlation with the questioned signature at each point in the reference signature can only be expected to be high over a limited range in distance or time of the correlation range. Quantitatively the correlation is defined by a correlation energy again related to the sum of squares of spatial differences, or to the elastic energy needed to transform the area of the reference signature within the correlation range into the questioned signature. A high correlation gives rise to a low correlation energy, and vice versa.

In evaluating these energies quantitatively, the reference and questioned signatures are broken into appropriate digital time steps $i_R$ and $i_Q$ respectively. The objective is to define a set of links $j_Q=\text{link}(i_R)$ made between corresponding points on the questioned and reference signatures. Generally the connections $j_Q=\text{link}(i_R)$ will increase monotonically along the signature as $i_R$ increases. However the generally different timing of the Q and R signatures will mean that the connections are distorted with time so that a linkages from the R signature at a given time may correlate well with one at a quite different time on the Q signature.

Figure 2:
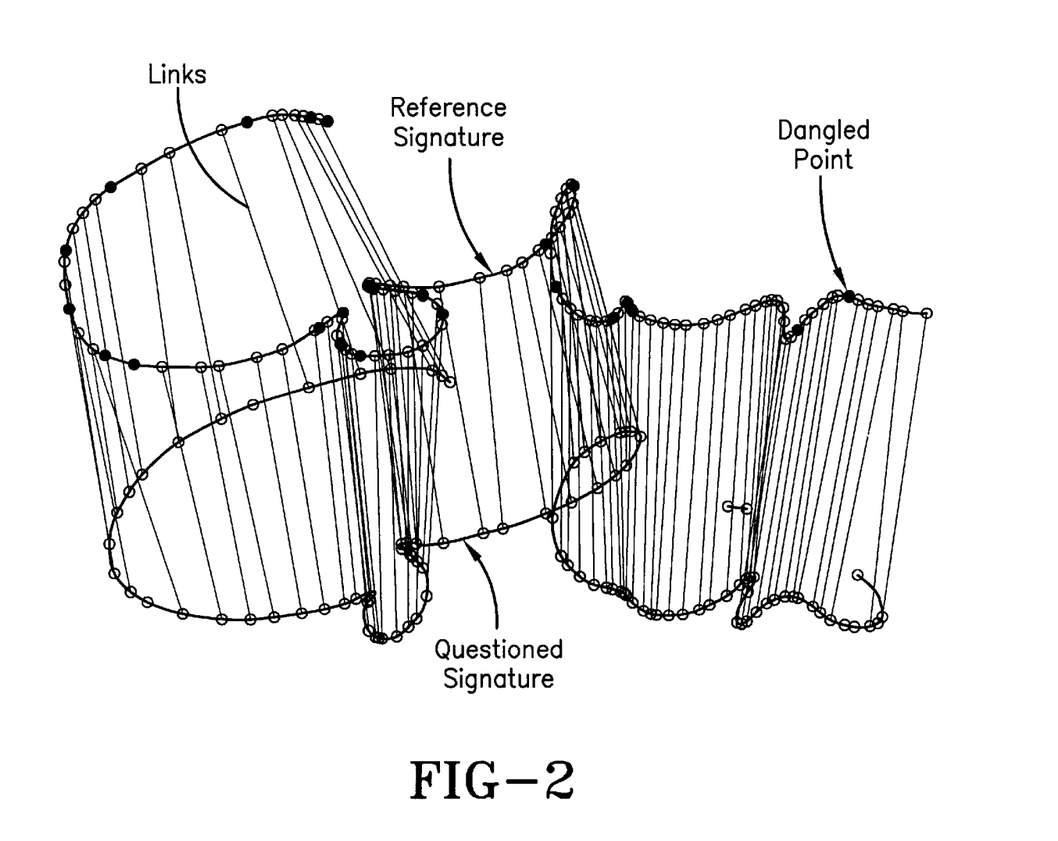
FIG. 2 shows a mapping of links between two signatures.

A good match, or set of connections $i_Q=\text{link}(i_R)$, as illustrated in FIG. 2, is assumed to be that which simultaneously has the following attributes:

1) The best spatial correlation between a subset of points $j_R$ and $j_Q$ within a correlation range centered on the linked points in either space or time.

2) The minimum elastic distortion between the actual connection $\text{link}(i_R)$ and a mean distortion vector [$dx(i_R)$, $dy(i_R)$], defined by the average of the connections between a different subset of points $k_R$ and $k_Q$ neighboring the connected points in either space or time.

3) The best approximation to a one-to-one mapping between the two signatures with each point $i_R$ on the reference signature linked uniquely to a single point link($i_R$) on the questioned signature. There may be occasions when no link can be found, for example, the dot of a dotted i in the reference signature when no corresponding dot was drawn in the questioned signature, are defined as dangled links and penalized.

4) The timing of the two signatures should correspond closely, with any time distortion between the points on the reference signature and linked points on the questioned signature or be penalized if the correspondence is not close. This term is closely related to the time distortion criteria used by Livshitz et al.

5) Other measurable variables of the signature process measured at the same time points $i_R$ and $i_Q$, for the two signatures $V_R(i_R)$ and $V_Q(i_Q)$, could be included so that any differences between linked points in the signatures would be included as an detriment to a good match. These variables could include the pressure $P_R(i_R)$ exerted by the pen, the three Euler angles $\theta$, $\phi$ and $\phi$ which may be used to define the elevation, azimuthal angle and axial orientation of the pen.

As can be seen in FIG. 2, the points along the signatures show the equal time intervals where linkages are made. Connections are shown between the reference signature at the top and the questioned signature below. Dangled points are shown by a filled circle.

In the mathematical formulation of the method, each of these attributes is described by an energy term, which may be defined for each point on the reference signature. These are subsequently summed over all points in the reference signature to define a global matching energy, which is then minimized by adjusting the linkages.

Figure 3:
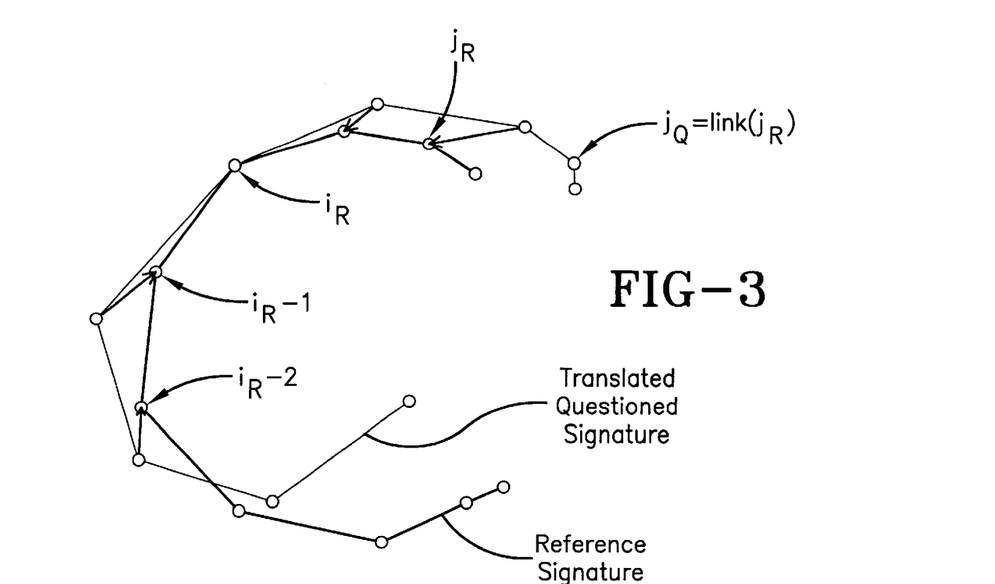
FIG. 3 illustrates the definition of the correlation energy $E_{corr}(i_R)$ for a given linkage from point $i_R$ in the reference signature to point $i_Q=\text{link}(i_R)$ in the questioned signature.

The first consideration is the correlation energy $E_{corr}(i_R)$ related to the $i_R$th point on the reference signature when linked to the corresponding point $i_Q=link(i_R)$ on the questioned signature, as shown in FIG. 3. This is given by the following sum of points $j_R$ and $j_Q$ which lie within the correlation distance of the central points $i_R$ and $i_Q$:

$$E_{coor}(i_R) = \sum_{j_R=i_R-n_{corr}}^{i_R+n_{corr}} (x_R(j_R) - x_Q[link(j_R)])^2 + ([y_R(j_R) - y_Q[link(j_R)]])^2, \quad (1)$$

where the points $j_R$ range from $i_R-n_{corr}$ to $i_R+n_{corr}$, and the corresponding points $j_Q$ range from $link(i_R-n_{corr})$ to $link(i_R+n_{corr})$. $n_{corr}$ is a parameter of the invention defining the number of time points along the signatures over which the correlations are evaluated. It is typically 5 time intervals, corresponding to 100 milliseconds in time along the signature. At a typical pen velocity of 200 mm per second this corresponds to a distance of 20 mm. This parameter may be subsequently optimized by finding the value that gives the best forgery discrimination over a database of genuine and forged signatures, the authenticity of which is known in advance.

As best seen in FIG. 3, the questioned signature is translated until the chosen point $i_R$ lies directly above the linked point $i_Q=link(i_R)$. The vectors shown by the heavy arrows give the displacements between nearby points on the reference signature and the points to which they are linked on the questioned signature. The correlation energy is the sum of the squares of these vectors. The number of correlated points in either direction from the chosen point $n_{corr}$ is illustrated for the case of $n_{corr}=2$.

The evaluation of the elastic distortion energy is more complex, since we do not wish to penalize smooth distortions such as a linear scaling of the two signatures. We rather wish to penalize curvature in the distortion. In order to achieve this we first define a "distortion vector" which gives a smoothed mapping between the reference and questioned signatures. This may be contrasted with the original link array.

Figure 4:
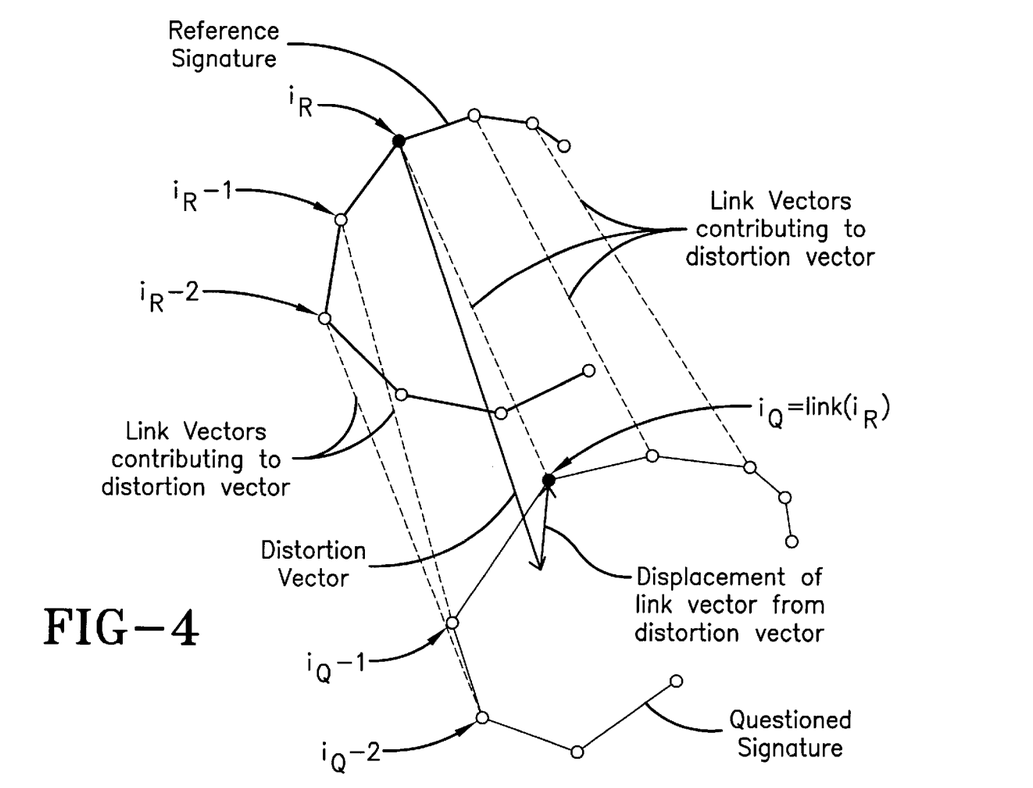
FIG. 4 shows the definition of the distortion energy $E_{dist}(i_R)$ for a given linkage from point $i_R$ in the reference signature to point $i_Q=\text{link}(i_R)$ in the questioned signature.

The distortion vector $[dx(i_R), dy(i_R)]$ where the $i_R$th point on the reference signature is linked to the corresponding point $i_Q=link(i_R)$ on the questioned signature is defined similarly as the mean vector between linked points when averaged over points within the defined distortion range, as can be seen in FIG. 4. For example:

$$dx(i_R) = \sum_{j_R=i_R-n_{dist}}^{i_R+n_{dist}} x_Q[link(j_R)] - x_R(j_R), \quad (2)$$

$$dy(i_R) = \sum_{j_R=i_R-n_{dist}}^{i_R+n_{dist}} y_Q[link(j_R)] - y_R(j_R).$$

Here the summation covers the points from $i_R-n_{dist}$ to $i_R-n_{dist}$. The distortion distance number $n_{dist}$ is a parameter of the invention defining the number of time points along the signature over which the distortion is evaluated. It is typically rather larger than the correlation distance number, say 10 time intervals, corresponding to around 200 milliseconds time or 40 mm distance. Again this parameter may be subsequently optimized by finding the value that gives the best forgery discrimination over a database of genuine and forged signatures, the authenticity of which is known in advance.

Referring again to FIG. 4, the link vectors in the neighborhood of the chosen linkage (five vectors in this example) are averaged to define the distortion vector. The distortion energy is the summed square of the displacement between the actual link vector and the distortion vector. The number of points within the distortion average in either direction from the chosen point is illustrated for the case of $n_{dist}=2$.

Having defined this distortion vector for all points $i_R$ within the reference signature the distortion energy $E_{dist}(i_R)$ related to the $i_R$th point on the reference signature when linked to the corresponding point $i_Q=link(i_R)$ on the questioned signature is given by:

$$E_{dist}(i_R) = \{x_Q[link(i_R)] - x_R(i_R) - dx(i_R)\}^2 + \{y_Q[link(i_R)] - y_R(i_R) - dy(i_R)\}^2 \quad (3)$$

This is the key equation of the invention, which differentiates it from the prior art. It evaluates not simply the strain energy of the elastic matching sheet (which would be the case if the dx and dy terms were omitted), but the curvature of this energy, that is the difference of the strain energy from the average strain energy of the neighborhood of the linkage. It is a high strain curvature energy which is characteristic of forgeries.

The degree of one-to-one mapping may be evaluated from the number of valid linkages, or bonds, $n_{link}(i_R)$ and $n_{link}(i_Q)$ connecting with each point on the reference and questioned signatures. For a one-to-one mapping both are equal to unity for all points $i_R$ and $i_Q$ but for dangled links where there is no appropriate link from the point on the reference signature to any on the questioned signature, $n_{link}(i_R)=0$.

Figure 5:
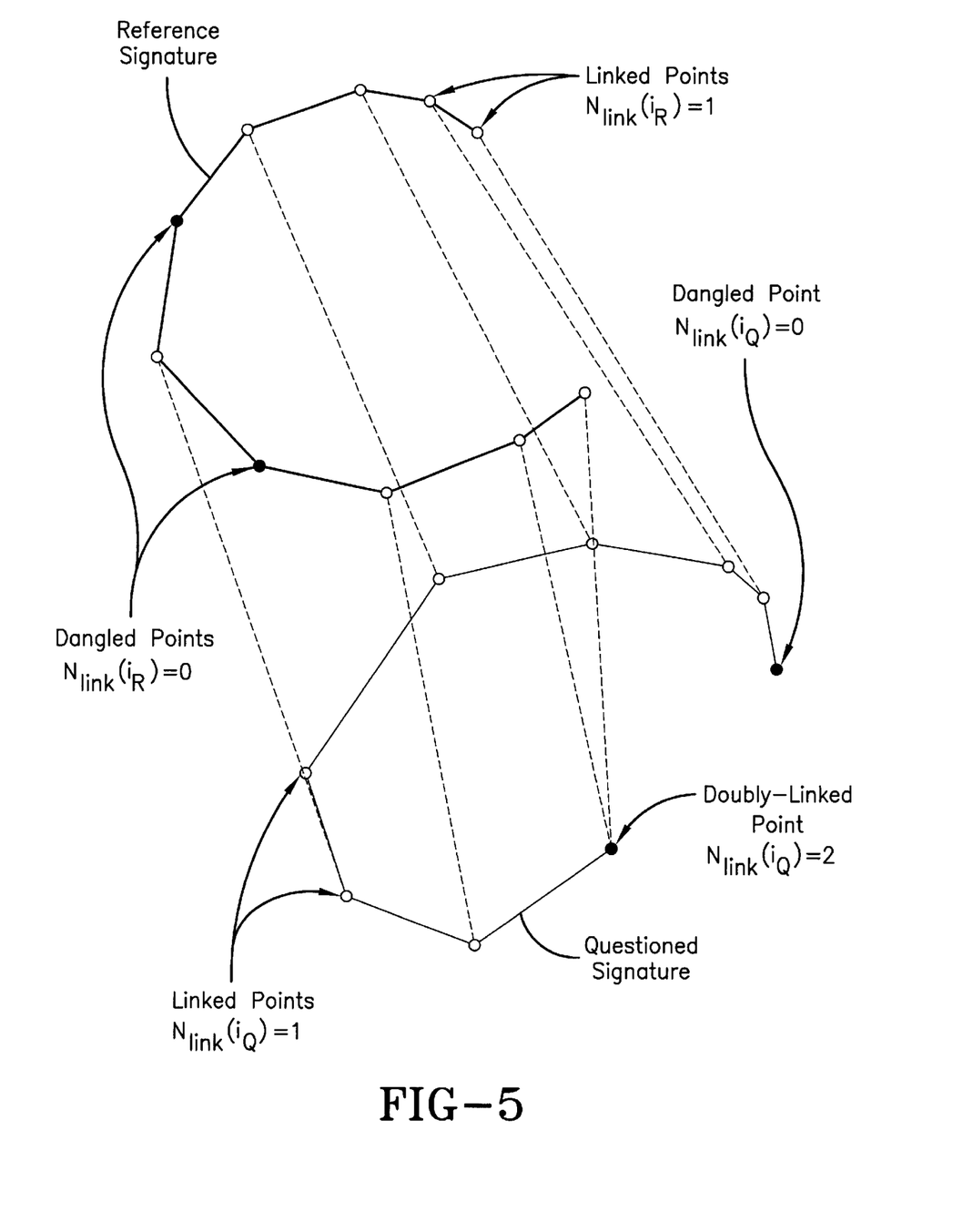
FIG. 5 illustrates the nature of the method used to penalize any deviations from one-to-one linking between the reference and questioned signatures.

On the questioned signature there are more possibilities. There may be no connected linkage, $n_{link}(i_Q)=0$ or there may be multiple links $n_{link}(i_Q)>1$. All these possibilities are appropriately penalized by the following definitions for the bond energy, as illustrated in FIG. 5:

$$E_{bond}(i_R)=[n_{link}(i_R)-1]^2, E_{bond}(i_Q)=[n_{link}(i_Q)-1]^2. \quad (4)$$

Again referring to FIG. 5, the open circles show points with the desired single linkage. Black points illustrate "dangled" points, where there the match shows no linkage to any point in the other signature, or multiple-linked points where more than a single linkage occurs. The bond energy term is proportional to $[n_{link}(i_R)-1]^2$ and $[n_{link}(i_Q)-1]^2$, so that it penalizes both types of mismatching.

Next, the error in the timing consequent on the assumed linkages is included. An authentic pair of signatures is likely to have linkages which keep in step with the passage of time, so that link($i_R$) is close to $i_R$. This factor has been used in the prior art by for example by Livshitz et al. It is here included by the equivalent energy term:

$$E_{time}(i_R)=[\text{link}(i_R)-i_R]^2 \quad (5)$$

Lastly the squared difference in any other measured pen variables $V_R(i_R)$ between the linked points may be included as an additional energy term. Whatever the nature of the new variable, the additional energy for the point $i_R$, linked to the point $i_Q$=link($i_R$) could be defined in the form:

$$E_V(i_R)=\{V_Q[\text{link}(i_R)]-V_R(i_R)\}^2. \quad (6)$$

These energies are now summed over points 1 to $n_R$ in the reference signature, (and also over the points 1 to $n_Q$ in questioned signature in the case of the bond energy) to define four total energies $E_{corr}$, $E_{dist}$, $E_{bond}$ and $E_{time}$ where:

$$E_{corr} = \sum_{i_R=1}^{n_R} F_{corr}E_{corr}(i_R), \quad (7)$$

$$E_{dist} = \sum_{i_R=1}^{n_R} F_{dist}E_{dist}(i_R),$$

$$E_{time} = \sum_{i_R=1}^{n_R} F_{time}E_{time}(i_R), \text{ and}$$

$$E_{bond} = \sum_{i_R=1}^{n_R} \{F_{bond}E_{bond}(i_R)\} + \sum_{i_Q=1}^{n_Q} \{F_{bond}E_{bond}(i_Q)\}.$$

Any additional variables for other pen variables that might be included in the match would give rise to extra energy terms $E_V$ of the form $$E_V = \sum_{i_R=1}^{n_R} F_V E_V(i_R). \quad (8)$$

The parameters of the invention $F_{corr}$, $F_{dist}$, $F_{bond}$, $F_{time}$ and any terms for other possible pen variables $F_V$ may be set to unity originally but are later refined by choosing the values giving the best discrimination over a database of signatures known to be authentic or forged. These four energies serve as our generalized features for the signature authenticity classification purpose. A total energy $E_{tot}$ is then defined which will be the global energy used in the optimization process $$E_{tot}=E_{corr}+E_{dist}+E_{bond}+E_{time} \quad (9)$$

Optionally other terms of the form $E_V$ as defined in equation 8 may be added to this summation to include matching with other possible pen variables V. The expression for $E_{tot}$ may equivalently be written (excluding any additional variables) as $$E_{tot} = \sum_{i_R=1}^{n_R} \{F_{corr}E_{corr}(i_R) + F_{dist}E_{dist}(i_R) + \quad (10)$$

$$F_{bond}E_{bond}(i_R) + F_{time}E_{time}(i_R)\} +$$

$$\sum_{i_Q=1}^{n_Q} \{F_{bond}E_{bond}(i_Q)\}$$

Figure 6:
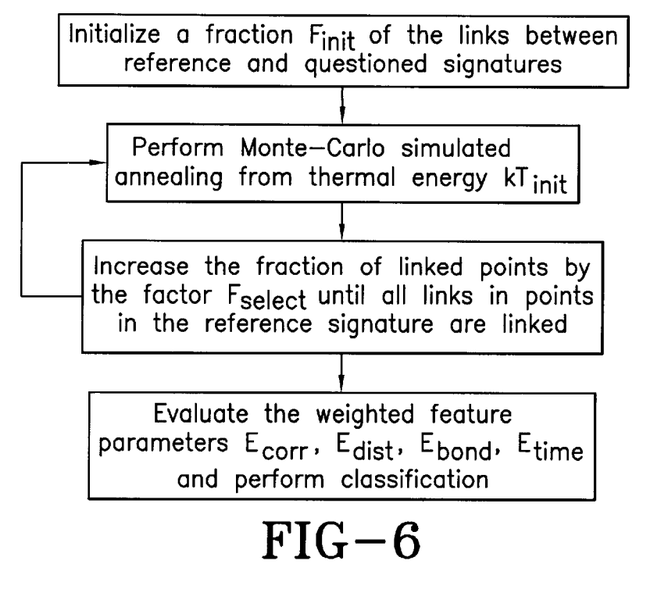
FIG. 6 illustrates the flowchart of the method from the initialization of links to the final classification.

The method proceeds iteratively, as shown in FIG. 6, and uses a complex process of link initialization to begin with the best possible set of linkages followed by the Monte Carlo simulated annealing method to alter the link array such as to reduce the total energy to a global minimum.

The problem which has to be addressed is that of the total energy minimization process converging on a "local minima" rather than on the true global minimum, which is the desired solution. For example if an attempt is made to match the signature "Folly" the problem which was mentioned in the prior art in connection with the invention of Livshitz et al will again occur. Linkages to the wrong "l" of "Folly" may well occur and local optimization of the total energy will refine this incorrect linkage. However the Monte Carlo simulated annealing method provides a method for recovery from the local minimum to the correct global one.

We first review the Monte Carlo simulated annealing method and indicate the problem that arises when a complete set of initial linkages has been made. The method originates from the work on molecular studies by Metropolis et al in 1953 and is conventional state of the art. A "temperature" T and corresponding "thermal energy" kT is defined, where k is Planck's constant. Possible linkage changes are chosen randomly, and the new global energy $E_{tot}$ evaluated. The change in the global energy $\Delta E_{tot}$ is evaluated and the change is always accepted if the total energy is reduced $\Delta E_{tot}<0$. However the change may also be accepted if the total energy increases $\Delta E_{tot}>0$ provided that the following condition is satisfied:

$$\exp\{\Delta E_{tot}/kT\}<RND, \quad (11)$$

where RND is a random number between 0 and 1, and exp is the exponential function. The name Monte Carlo comes from the use of random number generators, which like the dice throw, allow an unbiased exploration of all possible states of the system. It can be shown that after many iterations the distribution of total energies over time satisfies a Boltzmann distribution, that is there is a high probability of low energy states but also a finite probability of high energy states depending on the energy of those states compared with the chosen thermal energy kT according to the Boltzmann distribution $\exp(-E_{tot}/kT)$. Given a set of linkages which may lie in a local energy minimum, the Monte Carlo method applied with a thermal energy kT, high compared with the energy of the minimum, will allow occasional new linkages to be accepted which are able to "climb over" the energy barrier at the boundary of the local minimum. Having found such a state, the steeper gradient of the total energy variation on the side of the global minimum means that the state is likely to "fall" in this direction. Of course with such a high thermal energy there will always be several higher energy, non-optimal, linkages. However the global minimum energy may generally be reached by slowly lowering the thermal energy to zero temperature. This is the "simulated annealing" process, which is closely analogous to the annealing of metallic alloys, where defective structures and strained parts of the lattice may be annealed away by heating to a temperature comparable with the thermal energy needed to move atoms in the lattice (that is, a fraction of the melting point) and slowly cooling the alloy to a low temperature. Again when this model is used in signature matching these energies are purely mathematical and not a measure of any actual energy.

The problem with the Monte Carlo simulated annealing method used as described above is that it is so slow as to be computationally unfeasible. With all linkages connected, there will be perhaps 10 incorrect linkages to the wrong "l" in "Folly" which must all be moved. The answer is to make an initial selection of only a fraction of the linkages. Each linkage then has "room to move", and the speed of the Monte Carlo process is much increased.

The method used in the invention is as follows:

1) Choose a random point along the reference signature.
2) Choose the linkage on the questioned signature that gives the best local correlation
3) Choose another linkage randomly on the reference signature
4) Choose the linkage on the questioned signature, which gives the best local correlation within the allowed range of previously chosen linkages
5) Go back to step 4 until a chosen fraction $F_{init}$ of the linkages has been selected.

Figure 7:
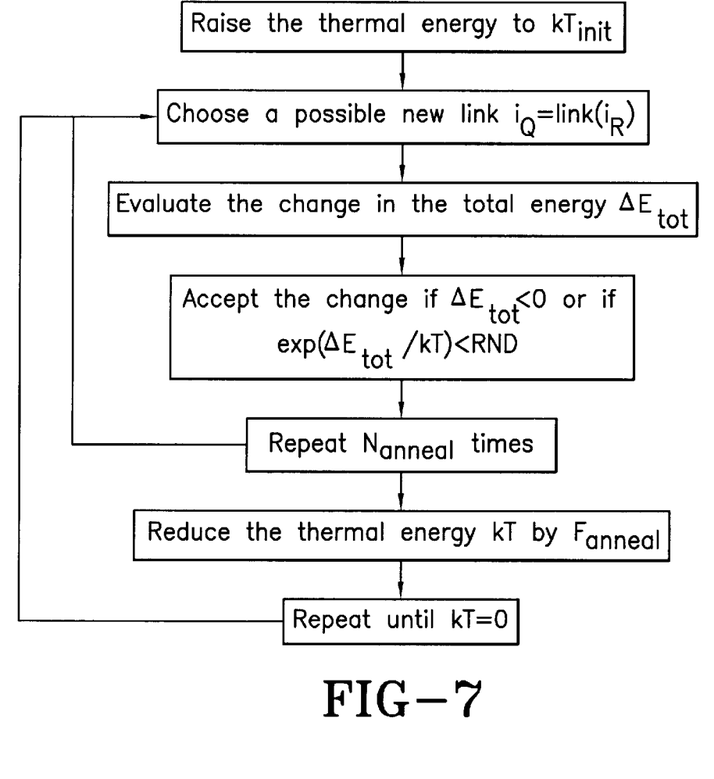
FIG. 7 illustrates the flow chart of the Monte Carlo simulated annealing process.

The fraction $F_{init}$ is a parameter of the invention and will typically be between 0.2 and 0.5. Too small a value and incorrect linkages may survive the Monte Carlo simulated annealing by having insufficient knowledge of the neighboring parts of the signature. Too large a value causes crowding of the linkages and slow convergence as described above. This parameter may be subsequently optimized by finding the value that gives the best forgery discrimination over a database of genuine and forged signatures, the authenticity of which is known in advance. Having chosen this partial set of linkages the following steps occur as shown in FIG. 7:

1) The thermal energy is raised to a value $kT_{init}$
2) The Monte Carlo simulated annealing procedure is now followed:
   a) Choose a random selected point on the reference signature $i_R$. There will be an existing linkage $link_{old}$ ($i_R$).
   b) Evaluate the total energy of the signature with the originally selected linkages $E_{old}$
   c) Choose a possible new linkage $link_{new}(i_R)$ from point $i_R$ to give the new energy $E_{new}$.
   d) Accept the linkage if:
      either: $E_{new} - E_{old} < 0$
      or: $\exp\{(E_{new} - E_{old})/kT\} < RND$. In this case update the linkage and the total energy.
3) Repeat step 2 for $N_{anneal}$ times.
4) Reduce the thermal energy by a factor $F_{anneal}$, and repeat the Monte Carlo procedure of step 2
5) Repeat step 4 $N_{select}$ times, after which the thermal energy will generally be zero.
6) Increase the selected fraction of points by a factor $F_{select}$, and go back to step 1, with a new thermal anneal.
7) Repeat step 6 increasing the selected fraction of points until all points are selected.

The factor $F_{anneal}$ and the number $N_{anneal}$ are related and generally need to be chosen so that the thermal energy smoothly reduces to zero within a suitable computation time. Typical values are $F_{anneal}=0.05$ and the number $N_{anneal}=200$. The longer the time spent on the anneal the better and more consistent will be the results. Too large a value for $F_{anneal}$ or too small a number $N_{anneal}$ and false connections may survive. Similarly $F_{select}$ and $N_{select}$ must be chosen together so that the extra linkages introduced at each step are correctly assimilated. In practice $F_{anneal}=1.5$ are $N_{select}=2000$ are sufficient. Generally the factors $F_{anneal}$ and $F_{anneal}$ and $N_{select}$ and $N_{select}$ are parameters of the invention. They may be subsequently optimized by finding the value, which gives the best forgery discrimination over a database of genuine and forged signatures, the authenticity of which is known in advance.

At the completion of the Monte Carlo simulated annealing procedure for total energy minimization, the four components of the total energy $E_{corr}$, $E_{disp}$, $E_{bond}$ and $E_{time}$ are recorded and may be used as generalized feature parameters in any state of the art classifier. For example, a database of genuine and forged signatures, the authenticity of which is known in advance, can be matched against the first authentic signature (or enrollment signature) for each person. The four feature parameters derived from each signature match can be used to provide inputs to, for example, a 4-dimensional Gaussian classifier. In this method the parameters of two 4-dimensional Gaussians may be fitted to the distributions of the authentic and forged signatures respectively in the 4-dimensional feature parameter space. A questioned signature may then be classified as authentic or forged according to which class center has the closest Manhanoblis distance to the point in the 4-dimensional feature parameter space derived from the match of the questioned signature with its enrollment signature. Other classifiers could be used for establishing an accepted criterion that both signatures were written by the specified person and for providing an indication of the acceptance or rejection of that signature.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A method for matching a reference signature designated R with a questioned signature designated Q to determine whether the signatures are written by a specified person, said method comprising the following steps:

a) writing a reference signature on a digitizer or touch-sensitive pad;

b) digitizing in space and time the reference signature, to give a series of time-related spatial data signals representative of the reference signature beginning with the start of the writing of the reference signature;

c) writing a questioned signature on a touch sensitive pad;

d) digitizing in space and time the questioned signature, to give a series of time-related spatial data signals representative of the questioned signature beginning with the start of the writing of the questioned signature;

e) creating a mapping between points measured at corresponding times in the two signatures to be compared, by matching the measured points that have a maximum correlation between similar areas centered on the measured points on the signatures and simultaneously have a minimum function representative of a curvature of any distortions between similar areas centered on the measured points on the signatures;

f) quantifying features, including correlation between the areas centered on the measured points in the signatures, the curvature of any distortions, degree of one-to-one mapping between mapped points, and time distortion between the signatures;

g) minimizing a function which maximizes local correlation, minimizes the curvature of spatial distortion, encourages a one-to-one mapping of points on the respective signatures and minimizes the time distortion; and h) comparing the quantified features with an accepted criterion of probability that both signatures were written by the specified person and providing an indication of the acceptance or rejection of the signature.

2. A method as set forth in claim 1, in which the corresponding matching points on the reference and questioned signatures which are optimal have the relation $i_Q$=link$(i_R)$, and are found by the following steps:

a) calculating a sense of spatial correlations between a subset of points $j_R$ and $j_Q$ within an area centered on the linked points with a specified correlation range;

b) calculating a mean distortion vector $[dx(i_R), dy(i_R)]$ defined by the average of the vectors making the connections between a different subset of points $j_R$ on the reference signature and $j_Q$ on the questioned signature within a defined distortion range, centered on the linked points;

c) calculating the distortion curvature from the squared difference between the actual connection $i_Q$=link$(i_R)$ and the mean distortion vector $[dx(i_R), dy(i_R)]$;

d) calculating the degree to which the links provides a one-to-one mapping between points on the reference and questioned signature by evaluating the number of links $n_{link}(i_R)$ and $n_{link}(i_Q)$ coming to each point on the reference and questioned signature respectively, and penalizing any points for which $n_{link}(i_R)$ or $n_{link}(i_Q)$ are not equal to unity;

e) calculating the time distortion from the squared differences between the time points $i_R$ on the reference signature and the linked points on the questioned signature $i_Q$;

f) evaluating a total energy function including positive definite terms to include all those desirable attributes of a good match and minimizing this function to find the optimal links between the points $i_Q$ and $i_R$; and g) ascribing adjustable weighting factors F to all the above factors to enable the relative weight to be given to each to be adjusted to give the optimum performance in the discrimination of authentic and forged signatures.

3. A method as set forth in claims 2, in which the correlation between linked points $i_R$ and $i_Q$ in the reference and questioned signatures is found by evaluating the equation:

$$E_{corr}(i_R) = \sum_{j_R=i_R-n_{corr}}^{i_R+n_{corr}} (x_R(j_R) - x_Q[link(i_R)])^2 + [y_R(j_R) - y_Q[link(i_R)]]^2$$

4. A method according to claim 3, wherein the spatial correlations and distortions are evaluated for the points $j_R$ from $i_R-n_{corr}$ to $i_R+n_{corr}$, and the corresponding points $j_Q$ are from link$(i_R)-n_{corr}$ to link$(i_R)+n_{corr}$, wherein $n_{corr}$ is defined as a parameter of the model defining the distances along the signatures over which the correlations are evaluated and $n_{corr}$ is optimized by finding the value which gives the best forgery discrimination over a database of genuine and forged signatures, the authenticity of which is known in advance.

5. A method as set forth in claim 2, wherein the mean distortion vector is found by evaluating the relation $$dx(i_R) = \sum_{j_R=i_R-n_{dist}}^{i_R+n_{dist}} x_Q[link(j_R)] - x_R(j_R),$$

$$dy(i_R) = \sum_{j_R=i_R-n_{dist}}^{i_R+n_{dist}} y_Q[link(j_R)] - y_R(j_R).$$

where the summation covers the time from $i_R-n_{dist}$ to $i_R+n_{dist}$, and wherein $n_{dist}$ is defined as the characteristic number of points in the signatures over which the distortion is evaluated and $n_{dist}$ is subsequently optimized by finding the value which gives the best forgery discrimination over a database of genuine and forged signatures, the authenticity of which is known in advance.

6. A method as set forth in claims 2, wherein the curvature of the distortion is evaluated from the relation $$E_{dist}(i_R) = \{x_Q[link(i_R)] - x_R(i_R) - dx(i_R)\}^2 + \{y_Q[link(i_R)] - y_R(i_R) - dy(i_R)]\}^2.$$

7. A method as set forth in claim 2, wherein the degree to which the links provide a one-to-one mapping between points on the reference and questioned signature is defined as the excess energy caused by any deviation from the one-to-one linkage of bonds calculated from the number of valid linkages, or bonds, $n_{link}(i_R)$ and $n_{link}(i_Q)$ connecting with each point on the reference and questioned signatures and is evaluated according to the relations;

$$E_{bond}(i_R) = [n_{link}(i_R)-1]^2, E_{bond}(i_Q) = [n_{link}(i_Q)-1]^2.$$

8. A method as set forth in claim 2, wherein the time distortion from the squared differences between the time points is evaluated by the relation;

$$E_{time}(i_R) = [link(i_R)-i_R]^2.$$

9. A method as set forth in claim 2, and further including at least one other measured pen variable wherein the effect of the difference between the signatures in the other measured pen variable V is evaluated by the relation;

$$E_V(i_R) = \{V_Q[link(i_R)] - V_R(i_R)\}^2.$$

10. A method as set forth in claim 2, wherein the total correlation, distortion, bond and time energies are found by sunning over the reference signature, and also over the questioned signature in the case of the bond energy to define four total energies $E_{corr}$, $E_{dist}$, $E_{bond}$ and $E_{time}$ by the relations;

$$E_{corr} = \sum_{i_R=1}^{n_R} F_{corr} E_{corr}(i_R), E_{dist} = \sum_{i_R=1}^{n_R} F_{dist} E_{dist}(i_R),$$

$$E_{time} = \sum_{i_R=1}^{n_R} F_{time} E_{time}(i_R)$$

and $$E_{bond} = \sum_{i_R=1}^{n_R} \{F_{bond} E_{bond}(i_R)\} + \sum_{i_Q=1}^{n_Q} \{F_{bond} E_{bond}(i_Q)\}.$$

wherein the parameters of the invention $F_{corr}$, $F_{dist}$, $F_{bond}$ and $F_{time}$ is set to unity and subsequently optimized by finding the value which gives the best forgery discrimination over a database of genuine and forged signatures, the authenticity of which is known in advance.

11. A method as set forth in claim 10, and further including at least one other measured pen variable wherein the effects the other pen variable included in the match gives rise to an extra energy terms $E_V$ of the form;

$$E_V = \sum_{i_R=1}^{n_R} F_V E_V(i_R).$$

wherein the parameters of the invention $F_V$ is set to unity and subsequently optimized by finding the value which gives the best forgery discrimination over a database of genuine and forged signatures, the authenticity of which is known in advance.

12. A method as set forth in claim 10, wherein the total energy $E_{tot}$ of the assumed set of linkages summed over all points in the reference and questioned signatures is evaluated according to the relation;

$$E_{tot} = E_{corr} + E_{dist} + E_{bond} + E_{time}.$$

13. A method as set forth in claim 12, wherein the generalized feature parameters $E_{corr}$, $E_{dist}$, $E_{bond}$ and $E_{time}$ are entered into a state of the art classifier to determine the degree of authenticity of the signatures being matched.

14. A method as set forth in claim 2, wherein the initial choice of linkages between the signatures is refined iteratively by means of a Monte Carlo simulated annealing procedure.

15. A method as set forth in claim 2, and further including the additional step of entering the numerical values found by evaluating the terms in a classification algorithm for pattern recognition, which has been trained previously, by operating on a database of genuine and forged signatures, the authenticity of which is known in advance, and which is adapted to provide an acceptance or rejection of the signatures as having been written by the specified person.

16. A method as set forth in claim 2, and further including the step of calculating the effect of differences between the signatures in any other measured pen variables V by evaluating the squared differences in the variables between linked points on the two signatures.

* * * * *